United States Patent [19]

Simonet

[11] 4,277,356

[45] * Jul. 7, 1981

[54] SOFT LITHIUM-TITANIUM-ZINC FERRITE

[75] Inventor: William Simonet, Paris, France

[73] Assignee: Thomson-CSF, Paris, France

[*] Notice: The portion of the term of this patent subsequent to May 22, 1996, has been disclaimed.

[21] Appl. No.: 4,199

[22] Filed: Jan. 17, 1979

Related U.S. Application Data

[63] Continuation-in-part of Ser. No. 859,714, Dec. 12, 1977, Pat. No. 4,155,863.

[30] Foreign Application Priority Data

Dec. 14, 1976 [FR] France .................. 76 37624

[51] Int. Cl.³ .............................. C04B 35/26
[52] U.S. Cl. ..................... 252/62.59; 252/62.56; 252/62.61; 252/62.62
[58] Field of Search ............... 252/62.59, 62.61, 62.62, 252/62.56

[56] References Cited

U.S. PATENT DOCUMENTS

| | | | |
|---|---|---|---|
| 3,483,126 | 12/1969 | Sara et al. | 252/62.59 |
| 3,630,912 | 12/1971 | Argentina et al. | 252/62.59 |
| 3,694,361 | 9/1972 | Smit et al. | 252/62.59 |
| 4,155,863 | 5/1979 | Simonet | 252/62.59 |

FOREIGN PATENT DOCUMENTS

| | | | |
|---|---|---|---|
| 2647893 | 5/1977 | Fed. Rep. of Germany | 252/62.61 |
| 2755525 | 6/1978 | Fed. Rep. of Germany | . |
| 2269506 | 11/1975 | France | 252/62.61 |
| 2328677 | of 0000 | France | . |

OTHER PUBLICATIONS

Agajaman "IBM Tech. Disclosure Bull.", vol. 11, No. 7, Dec. 1968 p. 797.

Primary Examiner—Jack Cooper
Attorney, Agent, or Firm—Oblon, Fisher, Spivak, McClelland & Maier

[57] ABSTRACT

A soft lithium-titanium zinc ferrite is provided which has a resistivity of at least $10^7$ ohm-cm measured at 20° C. and 100 volts, prepared from a mixture of oxides and/or carbonates in proportions, calculated as oxides, satisfying the formula $$Li_a Ti_t Zn_z Mn_m Fe_b O_4$$

wherein
$a = 0.5 (1 + t - z)$
$b = 0.5 (5 - 3t - z - 2m - 5\epsilon)$
$0 \leq t \leq 0.08$
$0.50 \leq z \leq 0.60$
$0.005 \leq m \leq 0.035$
$0.02 \leq \epsilon \leq 0.06$ and $\beta$ from 0.0015 to 0.05 molar equivalent of Bi, wherein the Bi is present in the starting mixture or is added after calcining. A process for producing these ferrites is provided, together with magnetic deflectors incorporating them.

8 Claims, 2 Drawing Figures

SOFT LITHIUM-TITANIUM-ZINC FERRITE

This application is a continuation in part of application Ser. No. 859,714 filed Dec. 12, 1977, now U.S. Pat. No. 4,155,863.

BACKGROUND OF THE INVENTION

1. Field of the Invention

The present invention relates to soft lithium-titanium-zinc ferrites having a resistivity of at least $10^7$ ohm-cm measured at 20° C. and 100 volts, which are particularly well-suited to use in the manufacture of magnetic deflectors, especially deflection yokes for television receivers.

2. Description of the Prior Art

The ferrites of the present invention are particularly useful in the manufacture of electronic components for use in low-frequency applications. Materials currently in use for this kind of application are primarily manganese-zinc ferrites and magnesium-zinc ferrites. Each of these has disadvantages which render them less than ideal with respect to the combination of properties which are desirable in such applications.

Manganese-zinc ferrites can be produced at low cost and have high initial permeabilities, but their resistivities are low, on the order of 1,000 ohm-cm. As a consequence, they must be electrically insulated when used in the manufacture of magnetic coils, and this substantially increases the total cost price of devices in which they are used.

Nickel-zinc ferrites may attain a resistivity as high as $10^5$ ohm-cm, but their cost is prohibitive and their magneto-striction is large, which generates background hum in television receivers.

Magnesium-zinc ferrites having minor substitution of manganese and copper are capable of resistivities of $10^6$ ohm-cm, but they cannot be manufactured below a temperature of 1250° C.

A need therefore continues to exist for a ferrite having high resistivity, high initial permeability, high saturation induction and high Curie point, and which can be manufactured at relatively low cost and at relatively low temperatures.

SUMMARY OF THE INVENTION

Accordingly, one object of the invention is to provide a soft lithium-titanium-zinc ferrite having a resistivity of at least $10^7$ ohm-cm, and initial permeability of at least 300, a saturation induction of at least 1500, and a Curie point of at least 150° C.

Another object of the invention is to provide a ferrite which can be manufactured at a temperature of 1100° C. or below.

A further object of the invention is to provide a ferrite which can be manufactured from starting materials whose purity need not exceed 96%.

Yet another object of the invention is to provide soft lithium-titanium-zinc ferrites which may be manufactured at a low cost.

A still further object of the invention is to provide a method for manufacturing such soft lithium-titanium-zinc ferrites, and to provide magnetic deflectors incorporating these ferrites.

Briefly, these objects and other objects of the invention as hereinafter will become more readily apparent can be attained by providing a soft lithium-titanium-zinc ferrite having a resistivity of at least $10^7$ ohm-cm measured at 20° C. and 100 volts, manufactured by forming a mixture of metal oxides and carbonates, crushing the formed mixture, calcining the crushed mixture in an air atmosphere at about 700° C. for about 2 hours, and sintering the calcined mixture in an oxygen-containing atmosphere at from 950° to 1100° C. for from 1 to 18 hours; wherein said mixture consists essentially of metal oxides and carbonates in proportions, calculated as oxides, which satisfy the formula $$Li_a Ti_t Zn_z Mn_m Fe_b O_4$$

wherein $a = 0.5(1+t-z)$
$b = 0.5(5-3t-z-2m-5\epsilon)$
$0 \leq t \leq 0.08$
$0.50 \leq z \leq 0.60$
$0.005 \leq m \leq 0.035$
$0.02 \leq \epsilon \leq 0.06$ and $\beta$ from 0.0015 to 0.05 molar equivalent of Bi, as the oxide or carbonate, wherein said Bi is present in said mixture prior to crushing or is added after calcining but prior to sintering.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
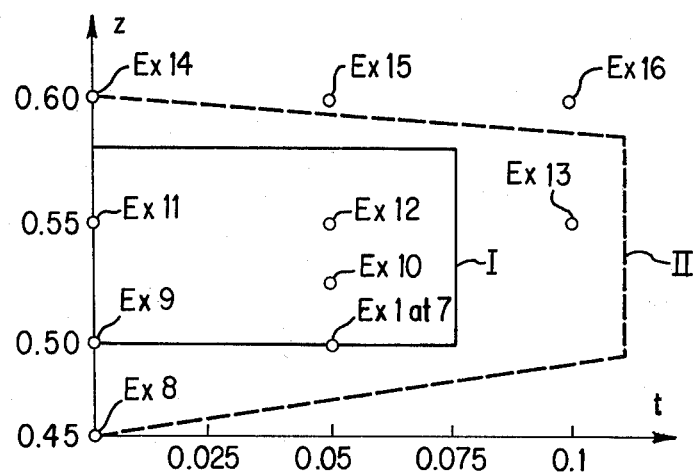
FIG. 1 is a diagram of the range of compositions studied, and including the optimum range of compositions according to the invention.

The ferrites of the present invention are prepared by a series of steps, beginning with a mixture of powdered metal oxides and other salts, which are crushed, calcined, optionally recrushed and compacted, and sintered, in a process similar to the type used for the manufacture of polycrystalline ferrites with spinel structure. The ferrites of the present invention are used in the manufacture of magnetic deflectors, especially deflection yokes for television receivers, wherein the magnetic deflection yoke comprises at least one of a ferrite core and a ferrit housing wherein the improvement comprises the ferrite being the ferrite of this invention.

The components of the starting mixture are present in proportions which satisfy formula I $$Li_a Ti_t Zn_z Mn_m Fe_b O_4 \quad (I)$$

wherein $a = 0.5(1+t-z)$
$b = 0.5(5-3t-z-2m-5\epsilon)$
$0 \leq t \leq 0.08$
$0.50 \leq z \leq 0.60$
$0.005 \leq m \leq 0.035$
$0.02 \leq \epsilon \leq 0.06$.

Bismuth is either included in the starting mixture in the proportion of from 0.0015 to 0.05 molar equivalent, or that amount of bismuth is added to the calcined material prior to sintering. The bismuth is a dopant which is essentially not a part of the composition of the principle crystalline phase, but constitutes a second phase located between the crystallites of the material. Bismuth is usually added in the form of its oxide or carbonate, or a mixture thereof. Preferably, the components of the starting mixture are present in proportions which satisfy the following formula $$Li_aTi_tZn_zMn_mFe_bO_4 + \beta Bi$$

wherein
 $0 \leq t \leq 0.06$
 $0.52 \leq z \leq 0.58$
 $0.03 \leq m \leq 0.035$
 $0.055 \leq \epsilon \leq 0.060$
 $0.010 \leq \beta \leq 0.015$
 $a = 0.5(1 + t - z)$
 $b = 0.5(5 - 3t - z - 2m - 5\epsilon)$ A small proportion of impurities such as carbon, silicon, calcium, magnesium and aluminum may be present without deleterious effect, up to a total of 5% by weight. Starting materials having impurity of at least 96% with respect to the critical elements are used, with the understanding that they may contain the aforementioned non-interfering impurities.

It is preferable to use starting materials having a high surface area, since the manufacturing steps are facilitated thereby. It has been found that calcining may be accomplished more quickly and at a lower temperature when very fine, highly reactive powders are used. There is a high correlation between a high state of subdivision, high reactivity and high surface area.

The preparation of materials according to the invention shown in the examples which follow used starting materials having approximately the following surface areas:

TABLE I

| COMPOUND | SURFACE AREA |
|---|---|
| $Li_2CO_3$ | 1.8 m$^2$/g |
| $TiO_2$ | 7.3 m$^2$/g |
| $ZnO$ | 4.6 m$^2$/g |
| $MnCO_3$ | 11.7 m$^2$/g |
| $Fe_2O_3$ | 3.7 m$^2$/g |
| $Bi_2O_2CO_3$ | 3.3 m$^2$/g |

Ferrites prepared according to the invention have resistivities at 20° C. and 100 volts which are at least $10^7$ ohm/cm, and preferably at least $10^9$ ohm/cm. Their initial relative permeability at 20° C. is at least 300, and preferably, at least 500. Their saturation induction at a magnetic field of 5 oersteds and a temperature of 100° C. is at least 1500, and preferably at least 2000. They have a Curie point of at least 150° C.

The manufacturing process for the ferrites of the invention will now be considered step by step, so that the details of the process may be better understood.

FIRST STEP: PRODUCTION OF A HOMOGENEOUS POWDERED MIXTURE HAVING A HIGH SURFACE AREA

The starting materials are weighed to a precision of 100 ppm, in the proportions indicated by formula (I). Heating losses and addition of iron during crushing are both taken into account. As will be seen in more detail in the examples, it is advantageous to have a slight deficiency in iron in the composition of the final material. In order to achieve a deficiency in iron $\epsilon'$ in the final product composition, a deficiency of iron $\epsilon$ is chosen in the starting material, such that the gain in iron attendant upon crushing with steel balls in a steel vessel is taken into account. This gain in iron during crushing depends in turn upon the type of crusher used, and the duration of the crushing operation, as well as upon the nature and grain size distribution of the materials being crushed. If $\epsilon_1$ corresponds to the gain in iron attendant upon crushing, it is seen that $$\epsilon = \epsilon' + \epsilon_1.$$

For examples 1-17 below, a crusher was used which operates by attrition in liquid medium. In order to avoid partial dissolution of lithium carbonate by water, an alcohol may be used, which is later eliminated by drying. In the examples, demineralized water was used, and the crushed material was then dried and carefully sieved. A crushing operation of about 30 minutes duration such as that described above, followed by drying, sieving and further mixing of the dry powders, produces a final powder having a surface area of 6 m$^2$/g, from starting materials with the surface areas specified above. The product has an even grain size, with an average grain diameter of 0.1 micrometer, with a small average deviation.

SECOND STEP: PRODUCTION OF THE FERRITE PHASE AND SHAPING OF ARTICLES FOR SINTERING (a) Calcining:
 The powder obtained from the first step is calcined for about two hours at about 700° C. in an air atmosphere. Calcining is carried out with the minimum possible compression of the powder in the oven. Loss of carbon dioxide is greatest at about 400° C. and the rate of formation of the ferrite phase is greatest at about 600° C. The ferrite phase is more than 95% formed at the conclusion of the calcining step.
 It has been shown that calcining in the absence of bismuth favors a rapid formation of the ferrite phase at a temperature not exceeding 700° C., with a relatively small increase in grain size. This is desirable in subsequent steps of the operation, and contributes to the high quality of the final product.

(b) Crushing with bismuth:
 Bismuth carbonate powder weighed in the first step according to the formula, is added to the calcined material obtained from the preceeding step. The bismuth is calculated on the basis of $\beta$ mole of Bi for each mole of formula (I). A further crushing of 30 minutes duration is effected under the same conditions used in the first step.

(c) Sieving and shaping:
 The cake resulting from the second crushing is dried, and the powder obtained is sieved. The sieved powder is isostatically pressed, according to conventional techniques, under a pressure of 1.5 to 2 tons/cm$^2$, preferably at about 1.6 ton/cm$^2$. Using the starting materials specified, and under the operating conditions described above, compact discs having about 55% of the theoretical density may be obtained without the use of a binder.
 It is possible to use binders, which are added either during the second crushing operation or between drying and sieving, and to form the product by compression molding at a pressure comparable to that used above. This alternative is generally used for articles having irregular shapes. When a binder is used, it is subsequently driven off by reheating either before or at the start of the sintering step.

THIRD STEP: SINTERING

The formed articles are then heat-treated for from 1 to 18 hours, preferably for 16 hours, at a temperature of from 950° C. to 1100° C., preferably at about 975° C., for from 8 to 16 hours, in an oxygen-containing atmosphere, preferably an oxygen atmosphere. Ferrites sintered in an air atmosphere have properties quite similar to those sintered in an oxygen atmosphere, except for their resistivities, which are lower by from 1 to 2 orders of magnitude.

The following examples will further illustrate the effect of varying one or more parameters on the properties of the resulting product. The examples are provided herein for purposes of illustration only, and are not intended to be limiting unless otherwise specified.

EXAMPLE 1: INFLUENCE OF DEFICIENCY OF IRON AND OF MANGANESE CONTENT

The parameter $\epsilon$ was varied from 0.02 to 0.06, and the parameter $\epsilon_1$ corresponding to the addition of iron during crushing was estimated at 0.02 from actual measurement. In the case where $\epsilon=0.02$, the deficiency in iron in the final product, $\epsilon'$, will be seen to be approximately 0.

Table 2 gives the results of variation of $\epsilon$ on the density d in g/cm$^3$, the magnetic moment $4\pi M_S$ in gauss, the real component $\mu'$ and the imaginary component $\mu''$ of the relative permeability and the resistivity in ohm-cm.

TABLE 2

| Sample No. | $\epsilon$ | d | $4\pi M_S$ | $\mu'$ | $\mu''$ | Resistivity in ohm-cm |
| --- | --- | --- | --- | --- | --- | --- |
| 1 | 0.02 | 4,869 | 3910 | 300 | 4 | $6 \times 10^7$ |
| 2 | 0.04 | 4,885 | 3890 | 410 | 6 | $2 \times 10^9$ |
| 3 | 0.06 | 4,881 | 3810 | 440 | 5 | $1.4 \times 10^{10}$ |

In the three examples shown, the coefficients of formula (I) were as follows:
t=0.05
z=0.5
m=0.035
$\beta$=0.005

The sintering was carried out in an oxygen atmosphere at 975° C. for 16 hours.

The permeability was measured at 50 KHz with an alternating magnetic field of 7.5 mOe. It may be seen from Table 2, that the resistivity reaches a very high value when the initial deficiency in iron exceeds 0.04. The resistivity is measured on a disc having a diameter of 10 mm and a thickness of 0.5 mm, with both faces silvered except for a guard ring of a few tenths of a mm. The measurements were made using a continuous voltage of 100 volts in an oil having a resistivity of $2\times 10^{13}$ ohm-cm at 20° C.

A mixture of starting materials having the same composition as that used for Sample 2 was divided in three parts and sintered at three different temperatures. The results are shown in Table 3.

TABLE 3

| Sample No. | Sintering Temperature | Resistivity in ohm-cm | $\mu'$ | $\mu''$ |
| --- | --- | --- | --- | --- |
| 2A | 975° C. | $2 \times 10^9$ | 410 | 6 |
| 2B | 1000° C. | $7 \times 10^8$ | 430 | 8 |

TABLE 3-continued

| Sample No. | Sintering Temperature | Resistivity in ohm-cm | $\mu'$ | $\mu''$ |
| --- | --- | --- | --- | --- |
| 2C | 1075° C. | $1.4 \times 10^8$ | 530 | 26 |

It may be seen that above 975° C. the permeability increases but the resistivity decreases.

The presence of manganese contributes to avoiding the formation of ferrous iron during the heat treatments. The Mn$^{3+}$ ion interconverts more easily between the trivalent and the divalent states than the Fe$^{3+}$ ion. It is known that the presence of divalent iron will considerably reduce the internal resistivity of the final material. Manganese, substituted for iron in the crystalline phase, has the two-fold advantage of neither reducing resistivity nor, in contrast to ferrous iron, adding to the magnetic drag, even in the form of the divalent Mn. However, manganese does have the disadvantage of reducing the Curie temperature. This disadvantage can be mitigated by holding the parameter m corresponding to the manganese content below or at most equal to 0.035. Excellent results can be obtained using the values
m=0.035
$\epsilon$=0.06.
These values are used in Sample 3 above and in other examples given below.

EXAMPLE 2: INFLUENCE OF BISMUTH CONTENT

Examination of mechanically polished or cleaved samples by scanning electron microscopy shows that bismuth forms a bismuth-rich second phase which forms at the grain boundaries. This second phase is much more resistive than the first crystallite phase and is liquid at the sintering temperature.

In Table 4, the effect of increasing bismuth content is correlated with the same properties as in Table 2, with the other parameters and the sintering temperature being the same as for Sample 3.

TABLE 4

| Sample No. | $\beta$ | d | $4\pi M_S$ | $\mu'$ | $\mu''$ | Resistivity in ohm-cm |
| --- | --- | --- | --- | --- | --- | --- |
| 4 | 0.0015 | 4.89 | 3830 | 440 | 8 | $4 \times 10^9$ |
| 5 | 0.005 | 4.88 | 3800 | 440 | 5 | $1.4 \times 10^{10}$ |
| 6 | 0.01 | 4.92 | 3840 | 450 | 5 | $3 \times 10^{10}$ |
| 7 | 0.02 | 4.93 | 3840 | 425 | 5 | $4 \times 10^{10}$ |

The results show that increasing bismuth content has the effect of increasing the overall resistivity of the material, measured on a disc having the aforementioned dimensions (10 mm diameter, 0.5 mm thickness). This is due to the fact that each crystallite is surrounded by a bismuth-containing phase. When the bismuth content exceeds 0.01, a certain saturation in the increase in resistivity is observed. It is not desirable to further increase the bismuth content on account of the difference in the coefficients of thermal expansion of the two phases, which may result in less complete cohesion between the crystallites and increased fragility of the final products.

The increase in resistivity with increased bismuth content holds for the entire range of compositions according to the invention.

The effect on this high resistivity due to bismuth of varying the voltage applied to the terminals of a sample disc, and of varying the temperature were studied. Measurements were carried out using a material according to the invention having the following parameters:
t=0
z=0.6
ε=0.06
m=0.035
β=0.01

Table 5 shows the variation in resistivity as a function of the voltage applied to the terminals of a sample disc having a thickness of 0.5 mm, measured at 13° C.

TABLE 5

| Voltage (V) | 20 | 60 | 100 | 150 | 200 | 250 | 300 |
|---|---|---|---|---|---|---|---|
| Resistivity in ohm-cm × $10^{-10}$ | 2.24 | 2.24 | 2.18 | 2.12 | 2.05 | 1.99 | 1.96 |

Table 6 shows the variation in resistivity as a function of temperature at a voltage of 100 volts applied to the same disc.

TABLE 6

| Temperature (°C.) | −20 | 0 | 20 | 40 | 60 | 80 | 100 | 120 | 140 |
|---|---|---|---|---|---|---|---|---|---|
| Resistivity in ohm-cm × $10^{-10}$ | 20. | 5. | 1.5 | 0.4 | 0.11 | 0.03 | 0.0085 | 0.0025 | 0.0007 |

An approximate formula for the variation of resistivity (ρ) as a function of temperature is as follows:

$$\rho = \rho_\infty \exp(W/kT)$$

where T is the absolute temperature in degrees Kelvin, k is the Boltzmann constant, W is taken as 0.55 eV, and $\rho_\infty$ as 2 ohm-cm.

In the range of the invention, the magnitude of variation of resistivity as a function of either applied voltage or temperature is roughly independent of the level of titanium and zinc contents.

The presence of bismuth during the sintering step has the following additional advantages:

(a) Effect on the temperature of maximum densification during sintering:

A liquid phase appears at about 780° C. As a consequence of this liquid phase, densification occurs at a much lower temperature while at the same time favoring the formation of crystallites of a desirable grain size (less than 30 microns). When the bismuth content reaches or exceeds 0.001 atom of bismuth per ferrite molecule, sintering at 975° C. is sufficient for the production of densities greater than 90% of the theoretical density. The increase in density shown in Table 4 does not only correspond to a systematic decrease in porosity, but also is due to the fact that bismuth is a heavy element which gives rise to a secondary phase heavier than the principle phase.

(b) Effect on the average size of crystallites:

Table 7 shows the effect on grain size for samples 4–7, all of which were sintered at 975° C. for 16 hours in an oxygen atmosphere.

TABLE 7

| Sample Number | Bi content β | Grain size in microns |
|---|---|---|
| 4 | 0.0015 | 20 |
| 5 | 0.005 | 9 |
| 6 | 0.01 | 7 |
| 7 | 0.02 | 6 |

Correlated with the decrease in grain size with increase in bismuth content is a better distribution of porosity throughout the grain boundaries and fewer porosity defects in the interior of the crystallites. This is probably the reason for which the initial permeability remains essentially constant while the grain size decreases from 20 to 6 microns. In effect, the mean free path of the boundaries of the magnetic domains remains essentially constant.

EXAMPLE 3: INFLUENCE OF ZINC AND TITANIUM CONTENTS

The effect of varying the contents of zinc, represented by the parameter z, and of titanium, represented by the parameter t, were studied by measuring various characteristics of the final products. The tests were carried out with the following values for other parameters:
m=0.035
ε=0.06
β=0.01

The following characteristics were measured:
$4\pi M_S$: in gauss, measured at 20° C.
$T_c$: Curie temperature in degrees Celsius.
μ': real component of the complex relative initial permeability measured at 20° C. in a 10 kHz alternating magnetic field having an amplitude of 7 mOe.
tgδ/μ': loss factor
ρ: resistivity in ohm-cm
TF: coefficient of variation of the permeability (TF=Δ μ/μ²ΔT, between +25° and +55° C.).
B: induction at 5 oersteds, at 25° C. and at 100° C.

TABLE 8

| Sample No. | 8 | 9 | 6 | 10 | 11 | 12 | 13 | 14 |
|---|---|---|---|---|---|---|---|---|
| z | 0.45 | 0.50 | 0.50 | 0.525 | 0.55 | 0.55 | 0.55 | 0.60 |
| t | 0 | 0 | 0.05 | 0.05 | 0 | ·0.05 | 0.10 | 0 |
| $4\pi M_S$ | 4445 | 3980 | 3900 | 3780 | 3500 | 3300 | 3000 | 3030 |
| $T_c$(°C.) | 322 | 279 | 264 | 248 | 238 | 220 | 200 | 196 |
| μ' (20° C.) | 340 | 420 | 440 | 460 | 510 | 570 | 610 | 660 |
| tg δ/μ' × $10^6$ | 46 | 40 | 37 | 35 | 33 | 30 | 31 | 30 |
| ρ × $10^{-8}$ | 92 | 100 | 160 | 130 | 140 | 170 | 110 | 160 |
| TF × $10^6$ | | 7.4 | 6.4 | 6.6 | 5.6 | 5.5 | 5.2 | 3.3 |
| B at 25° C. | 3340 | 3120 | 2940 | 2770 | 2750 | 2710 | 2400 | 2400 |
| B at 100° C. | 2800 | 2510 | 2310 | 2120 | 2110 | 1990 | 1720 | 1570 |

Table 9 shows certain characteristics obtained for 3 other samples (15–17). It is seen that these three samples show substantially lower inductions at 100° C.

TABLE 9

| Sample No. | 15 | 16 | 17 |
|---|---|---|---|
| z | 0.60 | 0.60 | 0.60 |
| t | 0.05 | 0.10 | 0.15 |
| $4\pi M_S$ | 2790 | 2500 | 2230 |
| $T_C$ | 172 | 150 | 127 |
| μ' | 710 | 740 | 800 |
| ρ × $10^{-8}$ | 90 | 63 | 100 |
| B (100° C.) | 1130 | 620 | 0 |

It may be seen from Tables 8 and 9 that the magnetization ($4\pi M_S$) and the Curie temperature diminish rapidly as the permeability increases, that is, as the zinc and/or titanium contents increase. Samples 11 and 12 represent the best balance of properties from the point of view of the manufacture of magnetic deflectors.

In all the examples given above (1–17), $\mu'$ remains essentially constant for magnetic field frequencies up to about 500 KHz.

FIG. 1 shows the range of zinc and titanium contents in the examples studied, as represented by the parameters z and t. A first region, represented by the solid line I, contains points representing examples 1–7 and 9–12. This region represents the range of values giving the best results for the manufacture of deflectors. A second region, represented by dotted line II, contains points representing Examples 8, 13 and 14.

Figure 2:
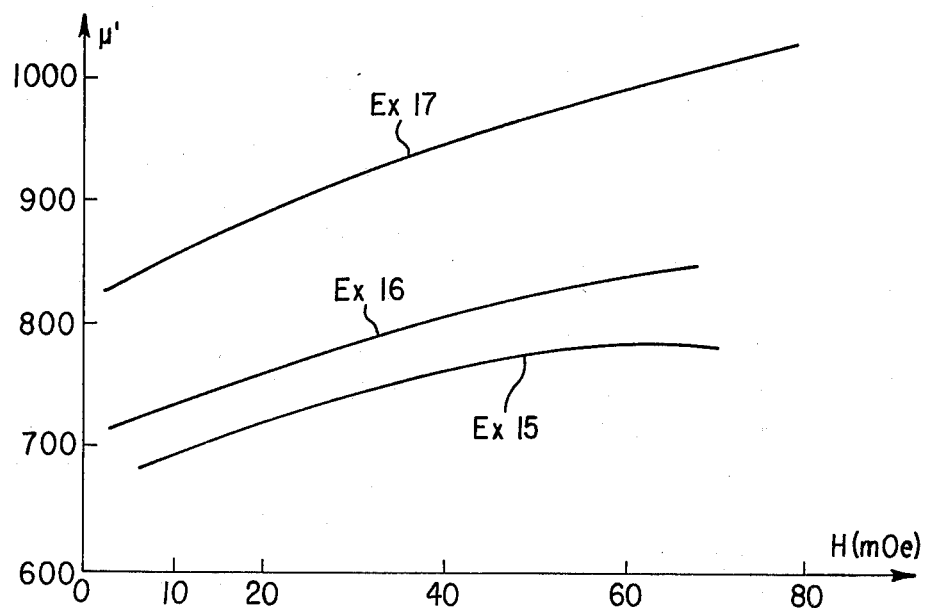
FIG. 2 shows the variation of initial permeability as a function of magnetic field strength.

FIG. 2 graphically illustrates the sensitivity of the relative initial permeability to variations in the magnetic field applied to the material, measured in milliOersteds, for materials having the compositions 15–17. These samples have an excellent permeability but nevertheless show a rather low induction B at 100° C.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A soft lithium-titanium-zinc ferrite having a resistivity of at least $10^7$ ohm-cm measured at 20° C. and 100 volts, manufactured by forming a mixture of metal oxides and carbonates, crushing said formed mixture, calcining said crushed mixture in an air atmosphere at about 700° C. for about 2 hours, and sintering said calcined mixture in an oxygen-containing atmosphere at from 950° to 1100° C. for from 1 to 18 hours; wherein said mixture consists essentially of metal oxides and carbonates in proportions calculated as oxides which satisfy the formula

$Li_aTi_tZn_zMn_mFe_bO_4 + \beta Bi$ wherein
$a = 0.5(1 + t - z)$
$b = 0.5(5 - 3t - z - 2m - 5\epsilon)$
$0 \leq t \leq 0.08$
$0.50 \leq z \leq 0.60$
$0.005 \leq m \leq 0.035$
$0.02 \leq \epsilon \leq 0.06$
and $\beta$ is from 0.0015 to 0.05 molar equivalent.

2. A soft lithium titanium-zinc ferrite having a resistivity of at least $10^7$ ohm-cm measured at 20° C. and 100 volts, manufactured by forming a mixture of metal oxides and carbonates, wherein said mixture consists essentially of metal oxides and carbonates in proportions calculated as oxides which satisfy the formula:

$Li_aTi_tAn_zMn_mFe_bO_4$ wherein
$a = 0.5(1 + t - z)$
$b = 0.5(5 - 3t - z - 2m - 5\epsilon)$
$0 \leq t \leq 0.08$
$0.50 \leq z \leq -0.60$
$0.005 \leq m \leq 0.035$
$0.02 \leq \epsilon \leq 0.06$;
crushing said formed mixture; calcining said crushed mixture in an air atmosphere at about 700° C. for about 2 hours; adding to said calcined mixture $\beta$ molar equivalent of Bi, as the oxide or carbonate, wherein $\beta$ is from 0.0015 to 0.05; and sintering said mixture of said calcined mixture and said Bi in an oxygen-containing atmosphere at from 950° to 1100° C. for from 1 to 18 hours.

3. The ferrite of claim 1 or 2, wherein
$0 \leq t \leq 0.06$
$0.52 \leq z \leq 0.58$
$0.03 \leq m \leq 0.035$
$0.055 \leq \epsilon \leq 0.060$
$0.010 \leq \beta \leq 0.015$.

4. The ferrite of claim 1 or 2, wherein
$t = 0$, $z = 0.55$, $m = 0.035$,
$\epsilon = 0.06$ and $\beta = 0.01$.

5. The ferrite of claim 1 or 2, wherein
$t = 0.05$, $z = 0.55$, $m = 0.035$,
$\epsilon = 0.06$ and $\beta = 0.01$.

6. A process for preparing soft lithium-titanium-zinc ferrites having a resistivity of at least $10^7$ ohm-cm measured at 20° C. and 100 volts, which comprises the steps of:

(a) crushing a mixture consisting essentially of metal oxides and carbonates in proportions, calculated as oxides, which satisfy the formula

$Li_aTi_tZn_zMn_mFe_bO_4$ wherein
$a = 0.5(1 + t - z)$
$b = 0.5(5 - 3t - z - 2m - 5\epsilon)$
$0 \leq t \leq 0.08$
$0.50 \leq z \leq 0.60$
$0.005 \leq m \leq 0.035$
$0.02 \leq \epsilon \leq 0.06$
and wherein from 0.0015 to 0.05 molar equivalent of Bi, as the oxide or carbonate, is present in said mixture or is added after step (b);

(b) calcining the crushed powder from step (a) in an air atmosphere for about 2 hours at about 700° C.; and (c) sintering the calcined material from step (b) in an oxygen-containing atmosphere at from 950° to 1100° C. for from 1 to 18 hours.

7. The process of claim 6, wherein said Bi is added after step (b), and a further crushing step is performed on the resultant bismuth-containing calcined material.

8. The process of claim 6, wherein said sintering (c) is carried out at a temperature of about 975° C. for from 8 to 16 hours in an oxygen atmosphere.

* * * * *